US009323398B2

(12) United States Patent
Bernstein et al.

(10) Patent No.: US 9,323,398 B2
(45) Date of Patent: Apr. 26, 2016

(54) TOUCH AND HOVER SENSING

(75) Inventors: Jeffrey Traer Bernstein, San Francisco, CA (US); David T. Amm, Sunnyvale, CA (US); Omar Leung, Palo Alto, CA (US); Christopher Tenzin Mullens, Santa Clara, CA (US); Brian Michael King, Santa Cruz, CA (US); Brian Richards Land, Redwood City, CA (US); Reese T. Cutler, Mountain View, CA (US)

(73) Assignee: Apple Inc., Cupertino, CA (US)

(*) Notice: Subject to any disclaimer, the term of this patent is extended or adjusted under 35 U.S.C. 154(b) by 872 days.

(21) Appl. No.: 12/501,382

(22) Filed: Jul. 10, 2009

(65) Prior Publication Data

US 2011/0007021 A1     Jan. 13, 2011

(51) Int. Cl.
*G06F 3/044* (2006.01)
*G06F 3/041* (2006.01)
*G06F 3/0486* (2013.01)

(52) U.S. Cl.
CPC .............. *G06F 3/044* (2013.01); *G06F 3/0416* (2013.01); *G06F 3/0486* (2013.01); *G06F 2203/04101* (2013.01)

(58) Field of Classification Search
CPC ........... G06F 3/01; G06F 3/041; G06F 3/044; G06F 2203/04104; G06F 2203/04108
USPC .................. 345/173–178; 178/18.01–18.06; 324/660, 686
See application file for complete search history.

(56) References Cited

U.S. PATENT DOCUMENTS

| 4,603,231 | A | * | 7/1986 | Reiffel et al. ............... 178/19.06 |
| 5,402,151 | A | * | 3/1995 | Duwaer ......................... 345/173 |
| 5,483,261 | A | | 1/1996 | Yasutake |
| 5,488,204 | A | | 1/1996 | Mead et al. |
| 5,825,352 | A | | 10/1998 | Bisset et al. |

(Continued)

FOREIGN PATENT DOCUMENTS

| JP | 2000-163031 A | 6/2000 |
| JP | 2002-342033 A | 11/2002 |

(Continued)

OTHER PUBLICATIONS

International Search Report mailed Apr. 20, 2011, for PCT Application No. PCT/US2010/041391, filed Jul. 8, 2010, six pages.

(Continued)

*Primary Examiner* — Amare Mengistu
*Assistant Examiner* — Stacy Khoo
(74) *Attorney, Agent, or Firm* — Morrison & Foerster LLP

(57) ABSTRACT

Improved capacitive touch and hover sensing with a sensor array is provided. An AC ground shield positioned behind the sensor array and stimulated with signals of the same waveform as the signals driving the sensor array may concentrate the electric field extending from the sensor array and enhance hover sensing capability. The hover position and/or height of an object that is nearby, but not directly above, a touch surface of the sensor array, e.g., in the border area at the end of a touch screen, may be determined using capacitive measurements of sensors near the end of the sensor array by fitting the measurements to a model. Other improvements relate to the joint operation of touch and hover sensing, such as determining when and how to perform touch sensing, hover sensing, both touch and hover sensing, or neither.

38 Claims, 13 Drawing Sheets

(56) References Cited

U.S. PATENT DOCUMENTS

| | | | |
|---|---|---|---|
| 5,835,079 A | 11/1998 | Shieh | |
| 5,880,411 A | 3/1999 | Gillespie et al. | |
| 6,137,427 A | 10/2000 | Binstead | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,335,642 B1* | 1/2002 | Hiroshima et al. | 327/102 |
| 6,650,157 B2* | 11/2003 | Amick et al. | 327/158 |
| 6,690,387 B2 | 2/2004 | Zimmerman et al. | |
| 7,015,894 B2 | 3/2006 | Morohoshi | |
| 7,084,643 B2* | 8/2006 | Howard et al. | 324/663 |
| 7,184,064 B2 | 2/2007 | Zimmerman et al. | |
| 7,315,793 B2* | 1/2008 | Jean | 702/150 |
| 7,663,607 B2 | 2/2010 | Hotelling et al. | |
| 8,149,002 B2 | 4/2012 | Ossart et al. | |
| 8,479,122 B2 | 7/2013 | Hotelling et al. | |
| 8,770,033 B2 | 7/2014 | Roziere | |
| 8,913,021 B2 | 12/2014 | Elias et al. | |
| 8,933,710 B2 | 1/2015 | Blondin et al. | |
| 9,086,768 B2 | 7/2015 | Elias et al. | |
| 2002/0121146 A1 | 9/2002 | Manaresi et al. | |
| 2004/0217945 A1* | 11/2004 | Miyamoto et al. | 345/173 |
| 2006/0026521 A1 | 2/2006 | Hotelling et al. | |
| 2006/0071913 A1 | 4/2006 | Wang et al. | |
| 2006/0097991 A1 | 5/2006 | Hotelling et al. | |
| 2006/0197749 A1 | 9/2006 | Popovich | |
| 2006/0197753 A1 | 9/2006 | Hotelling | |
| 2007/0074913 A1 | 4/2007 | Geaghan et al. | |
| 2007/0109274 A1* | 5/2007 | Reynolds | 345/173 |
| 2007/0152977 A1* | 7/2007 | Ng et al. | 345/173 |
| 2008/0007533 A1* | 1/2008 | Hotelling | 345/173 |
| 2008/0007543 A1 | 1/2008 | D'Souza | |
| 2008/0012835 A1* | 1/2008 | Rimon et al. | 345/173 |
| 2008/0041639 A1* | 2/2008 | Westerman et al. | 178/18.01 |
| 2008/0042660 A1 | 2/2008 | Ely et al. | |
| 2008/0062148 A1 | 3/2008 | Hotelling et al. | |
| 2008/0122798 A1 | 5/2008 | Koshiyama et al. | |
| 2008/0143683 A1* | 6/2008 | Hotelling | 345/173 |
| 2008/0158174 A1 | 7/2008 | Land et al. | |
| 2008/0174321 A1 | 7/2008 | Kang et al. | |
| 2008/0231292 A1 | 9/2008 | Ossart et al. | |
| 2008/0309632 A1* | 12/2008 | Westerman et al. | 345/173 |
| 2009/0009483 A1 | 1/2009 | Hotelling et al. | |
| 2009/0045823 A1 | 2/2009 | Tasher et al. | |
| 2009/0128515 A1 | 5/2009 | Bytheway | |
| 2009/0167325 A1 | 7/2009 | Geaghan | |
| 2009/0174675 A1 | 7/2009 | Gillespie et al. | |
| 2009/0219255 A1 | 9/2009 | Woolley et al. | |
| 2009/0234207 A1* | 9/2009 | Rantala | 600/323 |
| 2009/0251439 A1 | 10/2009 | Westerman et al. | |
| 2009/0289914 A1* | 11/2009 | Cho | 345/173 |
| 2009/0309851 A1* | 12/2009 | Bernstein | 345/174 |
| 2010/0026656 A1 | 2/2010 | Hotelling et al. | |
| 2010/0105443 A1 | 4/2010 | Vaisanen | |
| 2010/0110040 A1 | 5/2010 | Kim et al. | |
| 2010/0149126 A1 | 6/2010 | Futter | |
| 2010/0241956 A1 | 9/2010 | Matsuda et al. | |
| 2010/0253638 A1 | 10/2010 | Yousefpor et al. | |
| 2010/0321333 A1 | 12/2010 | Oda et al. | |
| 2010/0328262 A1 | 12/2010 | Huang et al. | |
| 2011/0025629 A1 | 2/2011 | Grivna et al. | |
| 2011/0050585 A1 | 3/2011 | Hotelling et al. | |
| 2011/0063247 A1 | 3/2011 | Min | |
| 2011/0115729 A1 | 5/2011 | Kremin et al. | |
| 2011/0157069 A1 | 6/2011 | Zhuang et al. | |
| 2011/0234523 A1 | 9/2011 | Chang et al. | |
| 2011/0273395 A1 | 11/2011 | Chung | |
| 2011/0273399 A1 | 11/2011 | Lee | |
| 2012/0007831 A1 | 1/2012 | Chang et al. | |
| 2012/0013399 A1 | 1/2012 | Huang | |
| 2012/0043971 A1 | 2/2012 | Maharyta | |
| 2012/0050180 A1 | 3/2012 | King et al. | |
| 2012/0050333 A1 | 3/2012 | Bernstein | |
| 2012/0092288 A1 | 4/2012 | Wadia | |
| 2012/0162088 A1 | 6/2012 | Van Lieshout et al. | |
| 2012/0176179 A1 | 7/2012 | Harders et al. | |
| 2012/0182251 A1 | 7/2012 | Krah | |
| 2012/0187965 A1 | 7/2012 | Roziere | |
| 2012/0188200 A1 | 7/2012 | Roziere | |
| 2013/0038863 A1 | 2/2013 | Fresquet | |
| 2013/0285971 A1 | 10/2013 | Elias et al. | |
| 2013/0285972 A1 | 10/2013 | Elias et al. | |
| 2013/0285973 A1 | 10/2013 | Elias et al. | |
| 2013/0314109 A1 | 11/2013 | Kremin et al. | |
| 2014/0085246 A1 | 3/2014 | Shahparnia | |
| 2014/0145732 A1 | 5/2014 | Blondin et al. | |
| 2014/0146006 A1 | 5/2014 | Luong | |
| 2014/0267165 A1 | 9/2014 | Roziere | |
| 2014/0360854 A1 | 12/2014 | Roziere | |
| 2015/0145802 A1 | 5/2015 | Yao et al. | |
| 2015/0324062 A1 | 11/2015 | Elias et al. | |

FOREIGN PATENT DOCUMENTS

| | | |
|---|---|---|
| JP | 2008-117371 A | 5/2008 |
| WO | WO-2005/114369 A2 | 12/2005 |
| WO | WO-2005/114369 A3 | 12/2005 |
| WO | WO-2008/121411 A1 | 10/2008 |
| WO | WO-2009/023880 A2 | 2/2009 |
| WO | WO-2009/023880 A3 | 2/2009 |
| WO | WO-2011/005977 A2 | 1/2011 |
| WO | WO-2012/027086 A2 | 3/2012 |
| WO | WO-2013/165925 A2 | 11/2013 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Mar. 3, 2015, for U.S. Appl. No. 12/895,643, filed Sep. 30, 2010, 22 pages.

Cypress. (Apr. 21, 2010). "Cypress's New Hover Detection for TrueTouch™ Touchscreen Solution Indicates Where a Finger Will Touch as It Approaches Screen," Press Release by Cypress Semiconductor Corp., located at <http://www.cypress.com/?rID=42779>, last visited Sep. 28, 2010, two pages.

Final Office Action mailed Aug. 19, 2013, for U.S. Appl. No. 12/895,643, filed Sep. 30, 2010, 18 pages.

Final Office Action mailed Aug. 14, 2014, for U.S. Appl. No. 13/460,620, filed Apr. 30, 2012, 17 pages.

Final Office Action mailed Oct. 14, 2014, for U.S. Appl. No. 13/460,652, filed Apr. 30, 2012, 16 pages.

International Search Report mailed Aug. 22, 2012, for PCT Application No. PCT/US2011/046814, filed Aug. 5, 2011, three pages.

International Search Report mailed Dec. 17, 2013, for PCT Application No. PCT/US2013/038706, filed Apr. 29, 2013, eight pages.

Non-Final Office Action mailed Mar. 29, 2013, for U.S. Appl. No. 12/895,643, filed Sep. 30, 2010, 16 pages.

Non-Final Office Action mailed Dec. 24, 2013, for U.S. Appl. No. 13/460,645, filed Apr. 30, 2012, 13 pages.

Non-Final Office Action mailed Jan. 30, 2014, for U.S. Appl. No. 13/460,620, filed Apr. 30, 2012, 14 pages.

Non-Final Office Action mailed Feb. 25, 2014, for U.S. Appl. No. 13/460,652, filed Apr. 30, 2012, 14 pages.

Non-Final Office Action mailed Aug. 15, 2014, for U.S. Appl. No. 12/895,643, filed Sep. 30, 2010, 19 pages.

(56) References Cited

OTHER PUBLICATIONS

Notice of Allowance mailed Aug. 15, 2014, for U.S. Appl. No. 13/460,645, filed Apr. 30, 2012, seven pages.
Notice of Allowance mailed Oct. 6, 2015, for U.S. Appl. No. 12/895,643, filed Sep. 30, 2010, 8 pages.
Notice of Allowance mailed mailed Mar. 16, 2015, for U.S. Appl. No. 13/460,620, filed Apr. 30, 2012, seven pages.

European Search Report mailed Jul. 20, 2015, for EP Application No. 15162455.8, three pages.
Non-Final Office Action mailed May 19, 2015, for U.S. Appl. No. 14/089,418, filed Nov. 25, 2013, 14 pages.
Notice of Allowance mailed Apr. 13, 2015, for U.S. Appl. No. 13/460,652, filed Apr. 30, 2012, seven pages.
Notice of Allowance mailed Aug. 5, 2015, for U.S. Appl. No. 13/460,620, filed Apr. 30, 2012, eight pages.

* cited by examiner

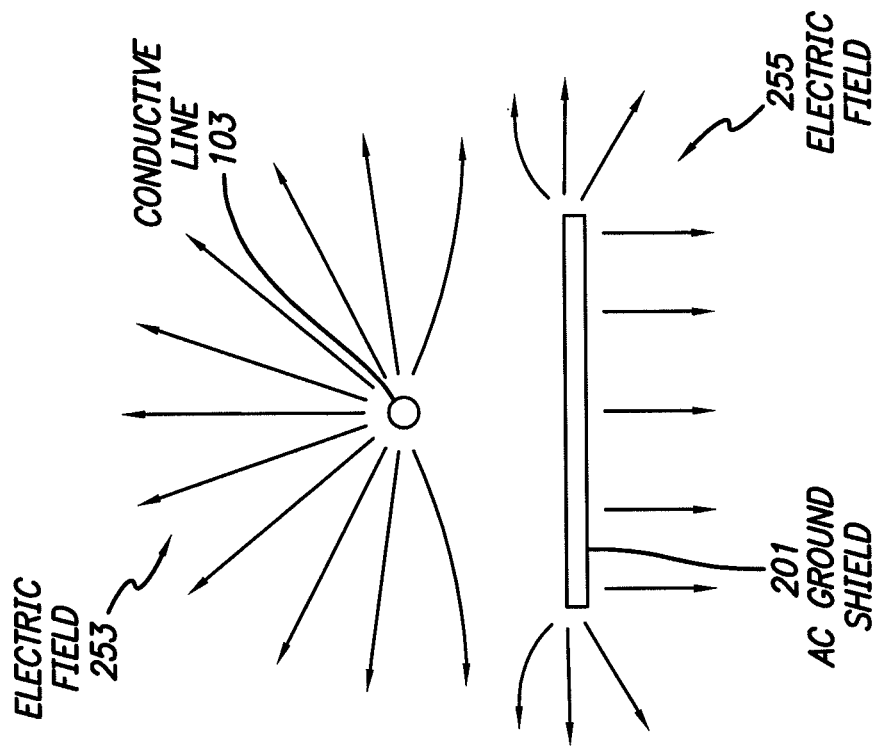
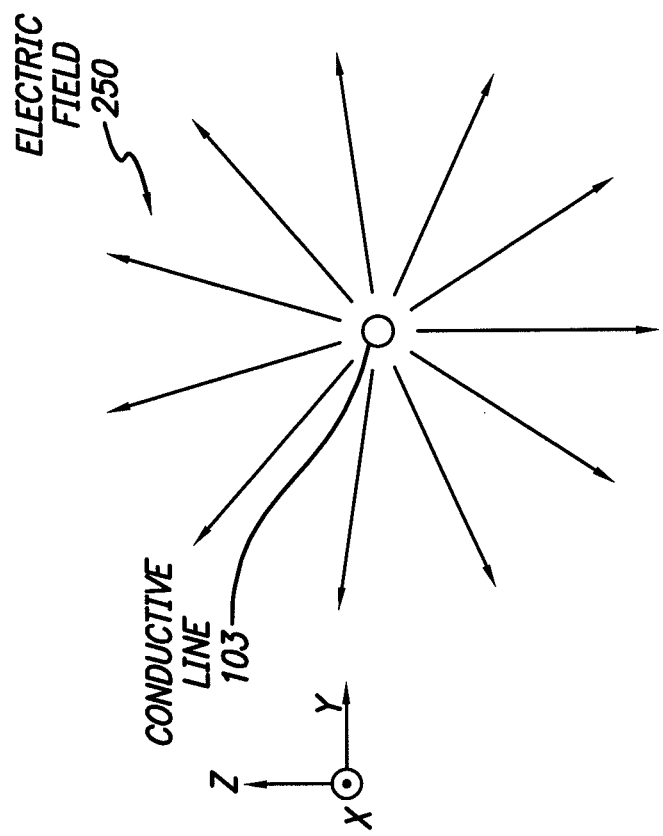
FIG. 2B
FIG. 2A

TOUCH AND HOVER SENSING

FIELD

This relates generally to touch and hover sensing, and in particular, to improved capacitive touch and hover sensing.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a transparent touch sensor panel positioned in front of a display device such as a liquid crystal display (LCD), or an integrated touch screen in which touch sensing circuitry is partially or fully integrated into a display, etc. Touch screens can allow a user to perform various functions by touching the touch screen using a finger, stylus or other object at a location that may be dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tin Oxide (ITO), often arranged in rows and columns in horizontal and vertical directions on a substantially transparent substrate. Drive signals can be transmitted through the drive lines, which can make it possible to measure the static mutual capacitance at the crossover points or adjacent areas (sensing pixels) of the drive lines and the sense lines. The static mutual capacitance, and any changes to the static mutual capacitance due to a touch event, can be determined from sense signals that can be generated in the sense lines due to the drive signals.

While some touch sensors can also detect a hover event, i.e., an object near but not touching the touch sensor, typical hover detection information may be of limited practical use due to, for example, limited hover detection range, inefficient gathering of hover information, etc.

SUMMARY

This relates to improved capacitive touch and hover sensing. A capacitive sensor array can be driven with electrical signals, such as alternating current (AC) signals, to generate electric fields that extend outward from the sensor array through a touch surface to detect a touch on the touch surface or an object hovering over the touch surface of a touch screen device, for example. The electric field can also extend behind the sensor array in the opposite direction from the touch surface, which is typically an internal space of the touch screen device. An AC ground shield may be used to enhance the hover sensing capability of the sensor array. The AC ground shield can be positioned behind the sensor array and can be stimulated with signals having the same waveform as the signals driving the sensor array. As a result, the electric field extending outward from the sensor array can be concentrated. In this way, for example, the hover sensing capability of the sensor array may be improved.

Hover sensing may also be improved using methods to detect a hover position of an object outside of a space directly above the touch surface. In particular, the hover position and/or height of an object that is nearby, but not directly above, the touch surface (in other words, an object outside of the space directly above the touch surface), e.g., in the border area at the end of a touch screen, may be determined using measurements of sensors near the end of the touch screen by fitting the measurements to a model. Other improvements relate to the joint operation of touch and hover sensing, such as determining when and how to perform touch sensing, hover sensing, both touch and hover sensing, or neither.

BRIEF DESCRIPTION OF THE DRAWINGS

The present disclosure, in accordance with one or more various embodiments, is described in detail with reference to the following figures. The drawings are provided for purposes of illustration only and merely depict example embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIGS. 2A-2B illustrate example sensor array configurations with and without an AC ground shield according to embodiments of the disclosure.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates generally to touch and hover sensing, and more particularly, to improved capacitive touch and hover sensing. For example, an alternating current (AC) ground shield may be used to enhance the hover sensing capability of a sensor array, such as a capacitive touch sensor array. Electrical signals, such as AC signals, transmitted to a capacitive touch sensor array in a touch screen can generate electric fields that extend outward from the sensor array through a touch surface to detect a touch on the touch surface or an object hovering over the touch surface. The electric field can also extend behind the sensor array in the opposite direction from the touch surface, which is typically an internal space of the touch screen device. An AC ground shield can be positioned behind the sensor array, and the AC ground shield can be stimulated with signals having the same waveform as the AC signals, for example. As a result, the electric field extending outward from the sensor array can be concentrated, as described in more detail below. In this way, for example, the hover sensing capability of the sensor array may be improved.

Hover sensing may also be improved using methods to detect a hover position of an object outside of a space directly above the touch surface. In particular, the hover position and/or height of an object that is nearby, but not directly above, the touch surface (in other words, an object outside of the space directly above the touch surface), e.g., in the border area at the end of a touch screen, may be determined using measurements of sensors near the end of the touch screen by fitting the measurements to a model, as described in more detail below. Other improvements relate to the joint operation of touch and hover sensing, such as determining when and how to perform touch sensing, hover sensing, both touch and hover sensing, or neither, as described in more detail below.

Figure 1A:
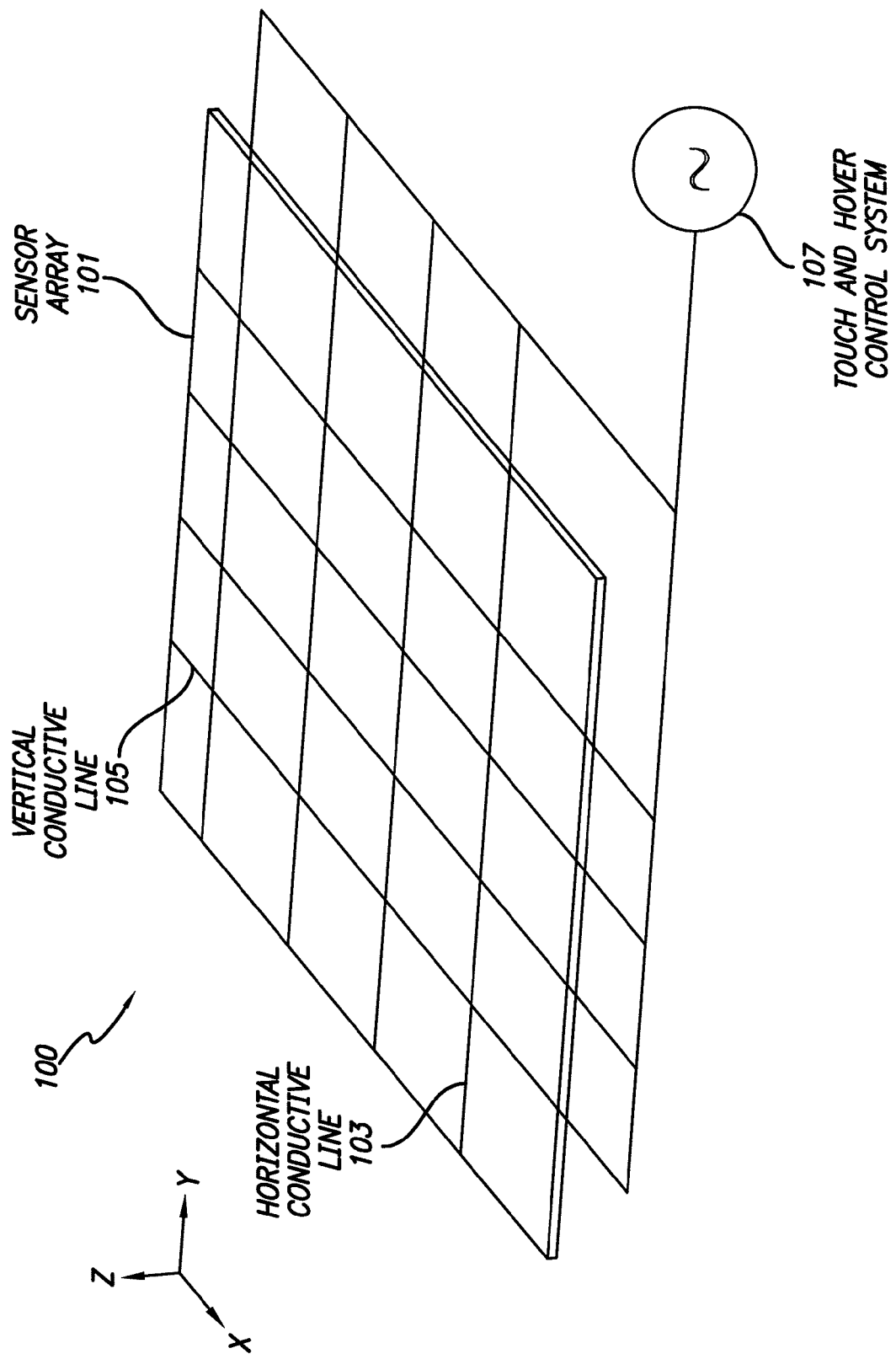
FIGS. 1A-1B illustrate an example sensor array and AC ground shield according to embodiments of the disclosure.
Figure 1B:
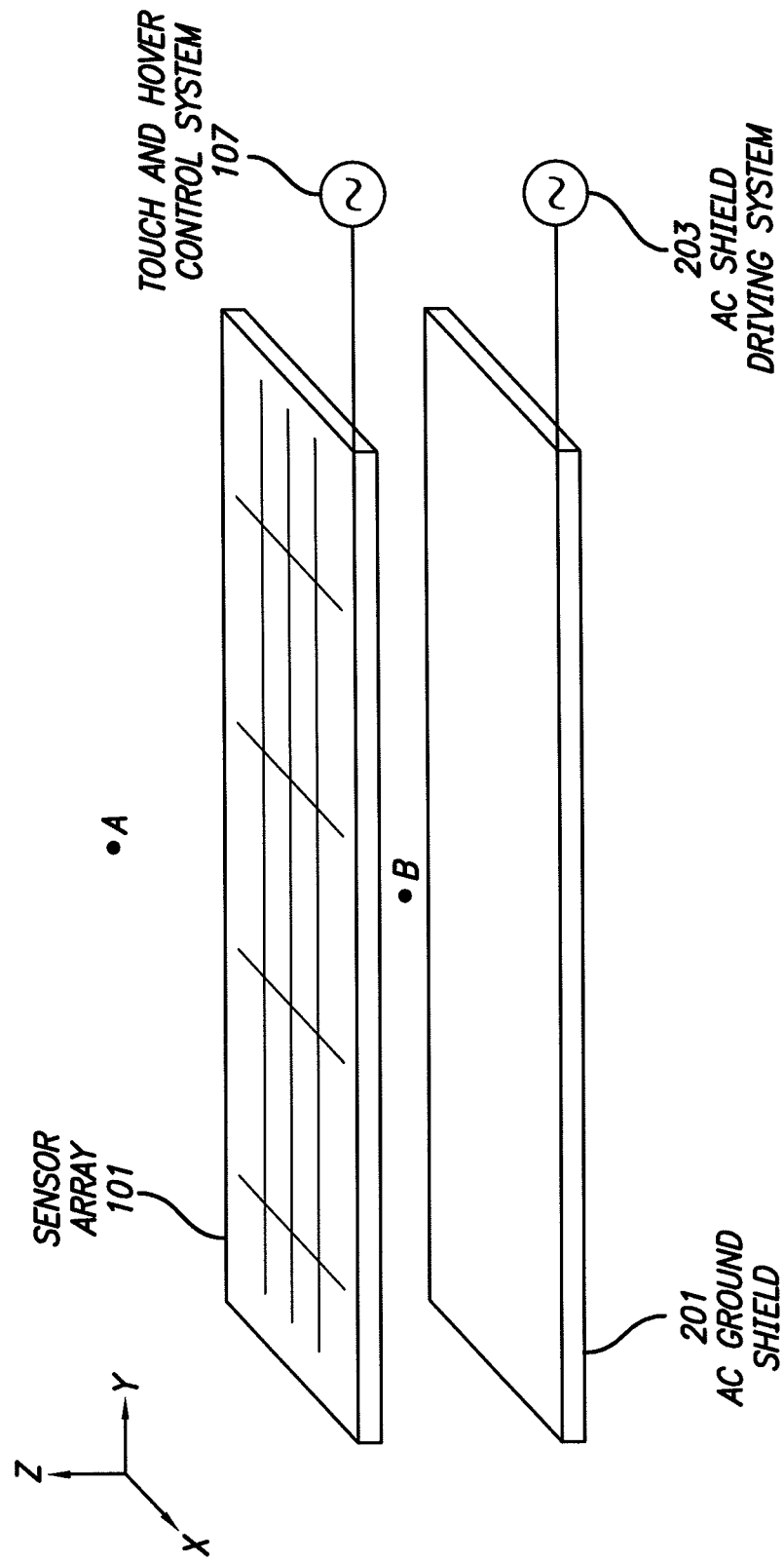

FIGS. 1A and 1B show an example embodiment of a capacitive touch and hover sensing apparatus that includes an AC ground shield (also referred to as a "driven shield").

FIG. 1A shows a portion of a touch and hover sensing apparatus 100 with a sensor array 101 that includes an array of horizontal lines 103 and vertical lines 105. Horizontal lines 103 and vertical lines 105 can be, for example, electrically conductive lines in a self capacitive sensing system. In other embodiments, other types of sensing schemes may be used, such as mutual capacitive, optical, ultrasonic, etc. In some embodiments, such as touch screens, for example, lines 103 and/or 105 can be formed of substantially transparent conductive materials. In some embodiments, such as trackpads, for example, lines 103 and/or 105 may be formed of a non-transparent conductive material.

Touch and hover sensing apparatus 100 also includes a touch and hover control system 107 that can drive sensor array 101 with electrical signals, e.g., AC signals, applied to horizontal lines 103 and/or vertical lines 105. The AC signals transmitted to sensor array 101 create electric fields extending from the sensor array, which can be used to detect objects near the sensor array. For example, an object placed in the electric field near sensor array 101 can cause a change in the self capacitance of the sensor array, which can be measured by various techniques. Touch and hover control system 107 can measure the self capacitance of each of the horizontal and vertical lines to detect touch events and hover events on or near sensor array 101.

The maximum range of detection can depend on a variety of factors, including the strength of the electric field generated by sensor array 101, which can depend on the voltage, i.e., amplitude, of the AC signals used for detection. However, the AC signal voltage may be limited by a variety of design factors, such as power limitations, impedance limitations, etc. In some applications, such as consumer electronics in general and portable electronics in particular, the limited maximum voltage of the AC signals may make it more difficult to design touch and hover sensing systems with acceptable detection ranges.

In this regard, FIG. 1B shows an AC ground shield system that can be used with sensor array 101. The AC ground shield system includes an AC ground shield 201 and an AC shield driving system 203. AC ground shield 201 can be positioned substantially behind sensor array 101, that is, on the side of sensor array 101 opposite to the touch and hover detection side of the sensor array. AC shield driving system 203 can transmit AC signals to AC ground shield 201 to create an electric field that can help concentrate the electric field generated by sensor array 101 in a detection space above sensor array 101 (shown as the z-direction in FIG. 1B).

FIGS. 2A and 2B illustrate an example of how the electric field generated by sensor array 101 may be concentrated by AC ground shield 201. FIG. 2A shows a stimulated horizontal conductive line 103 of sensor array 101 in a configuration without AC ground shield 201. An electric field 250 extends substantially radially from horizontal conductive line 103 in all directions. FIG. 2B illustrates how including AC ground shield 201 with the configuration of FIG. 2A can concentrate electric field of conductive line 103 into a different electric field 253. In FIG. 2B, horizontal conductive line 103 of sensor array 101 is stimulated in the same way as in FIG. 2A, and AC ground shield 201 is stimulated in a substantially similar way as conductive line 103. For example, the AC signals transmitted to AC ground shield 201 can have substantially the same waveform as the AC signals transmitted to sensor array 101, such that the voltage of the AC ground shield can be substantially the same as the voltage of sensor array 101 at any particular time. The stimulation of AC ground shield generates an electric field 255. FIG. 2B shows electric field 253 concentrated above (in the z-direction) horizontal conductive line 103 due to the operation of AC ground shield 201. In this way, for example, the addition of AC ground shield 201 can help boost the detection range of sensor array 101.

In addition, AC ground shield 201 can reduce or eliminate the electric field between sensor array 101 and AC ground shield 201. More particularly, even though the voltages on sensor array 101 and AC ground shield 201 may be changing over time, the change can be substantially in unison so that the voltage difference, i.e., electric potential, between the sensor array and the AC ground shield can remain zero or substantially zero. Therefore, little or no electric fields may be created between sensor array 101 and AC ground shield 201. FIG. 2B, for example, shows that the space between horizontal conductive line 103 and AC ground shield 201 is substantially free of electric fields in the example configuration.

Figure 3:
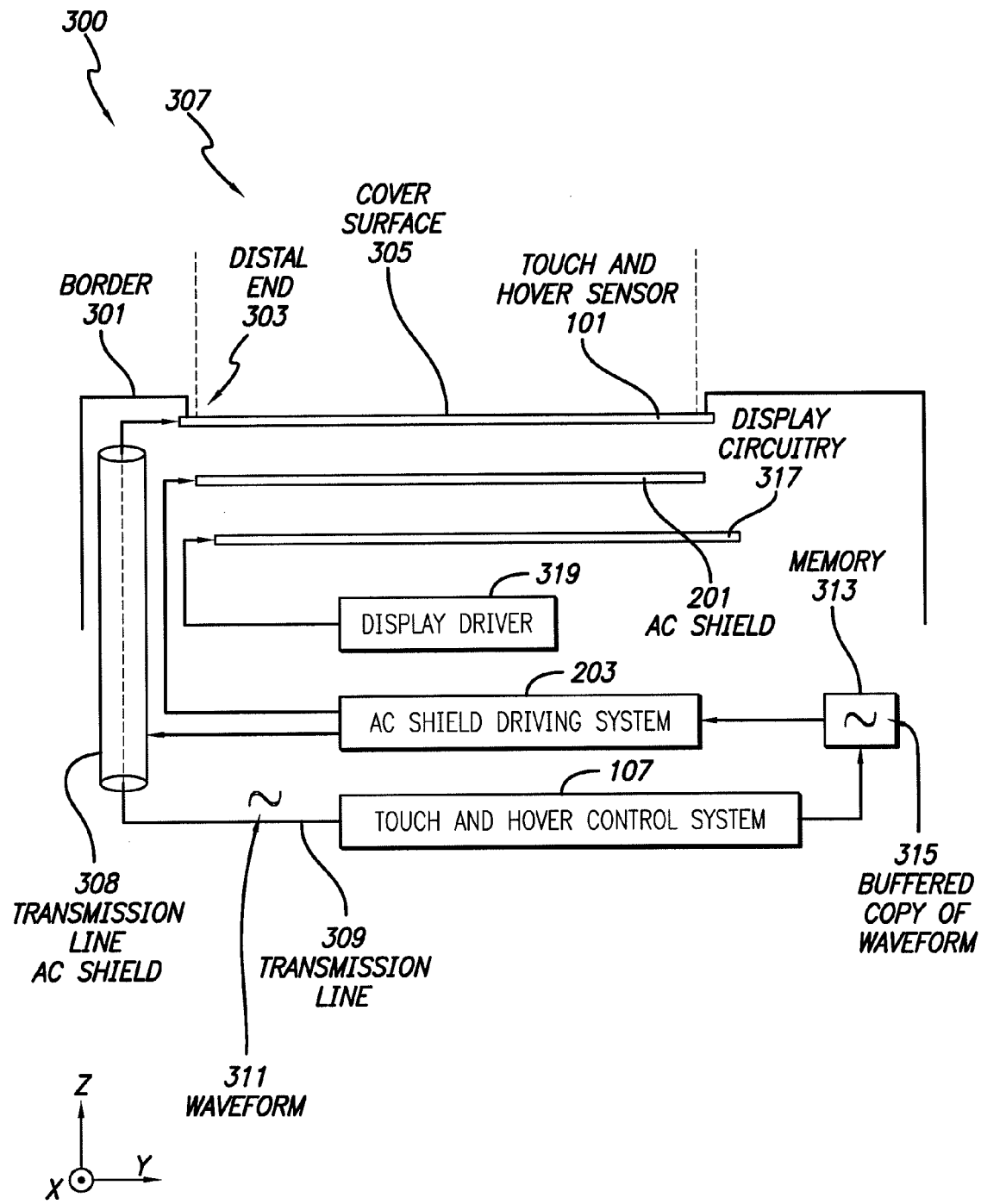
FIG. 3 illustrates an example touch screen according to embodiments of the disclosure.

FIG. 3 illustrates an example embodiment in which sensor array 101, touch and hover control system 107, AC ground shield 201, and AC shield driving system 203 are implemented in a touch screen 300. In this example, horizontal lines 103 and vertical lines 105 can be electrodes formed of a substantially transparent conductor. FIG. 3 shows a portion of touch screen 300 in which sensor array 101 and AC ground shield 201 can be substantially co-located with display circuitry 317, and in particular, AC ground shield can be positioned substantially between display circuitry 317 and sensor array 101. A border 301 holds distal ends 303 of sensor array 101. The user can view a displayed image through a cover surface 305 and can, for example, touch the cover surface with their fingers and/or hover their fingers near the cover surface in a space 307 directly above sensor array 101 in order to activate corresponding elements of a graphical user interface (GUI) corresponding to the detected touch events and/or hover events. In this example, touch and hover control system 107 transmits AC signals having a waveform 311 on a transmission line 309 that connects the touch and hover control system to sensor array 101. Touch and hover control system 107 also transmits waveform 311 to a memory 313 for storage. Memory 313 stores a buffered copy 315 of waveform 311. AC shield driving system 203 reads buffered copy 315 of the waveform from memory 313 and generates corresponding AC signals with waveform 311, which are then transmitted to AC ground shield 201. In this example configuration, sensor array 101 can be positioned substantially between AC ground shield 201 and cover surface 305, and AC ground shield 201 operates as described above to concentrate electric fields in detecting space 307 over cover surface 305.

The configuration of AC ground shield 201 may also help to shield sensor array 101 from other electronics and/or sources of ground, such as from display circuitry 317 which can be driven by a display driver 319 to generate an image viewed through cover surface 305. In particular, as described above, AC ground shield 201 can help prevent or reduce an electric field emanating from sensor array 101 in the direction of the AC ground shield. In the configuration shown in FIG. 3, AC ground shield 201 can be positioned between sensor array 101 and other internal electronics, such as display circuitry 317 and display driver 319. Therefore, AC ground shield 201 can prevent or reduce an electric field emanating from sensor array 101 that could reach display circuitry 317 and display driver 319. In this way, AC ground shield 201 may help electrically isolate sensor array 101 from other internal electronics in this example configuration, which may reduce undesirable effects such as noise, stray capacitance, etc. that could interfere with the accurate measuring of capacitance changes caused by objects touching/hovering in detection space 307.

Another type of AC shield, a transmission line AC shield 308, is shown in FIG. 3. Transmission line AC shield 308 substantially surrounds a portion of transmission line 309. AC shield driving system 203 also uses buffered copy 315 to transmit signals with waveform 311 to transmission line AC shield 308. This can help to shield transmission line 309 by reducing electric fields emanating from the transmission line. However, in contrast to AC ground shield 201, transmission line AC shield 308 does not serve to concentrate fields emanating from transmission line 309 to boost a range of detection, for example.

Figure 4:
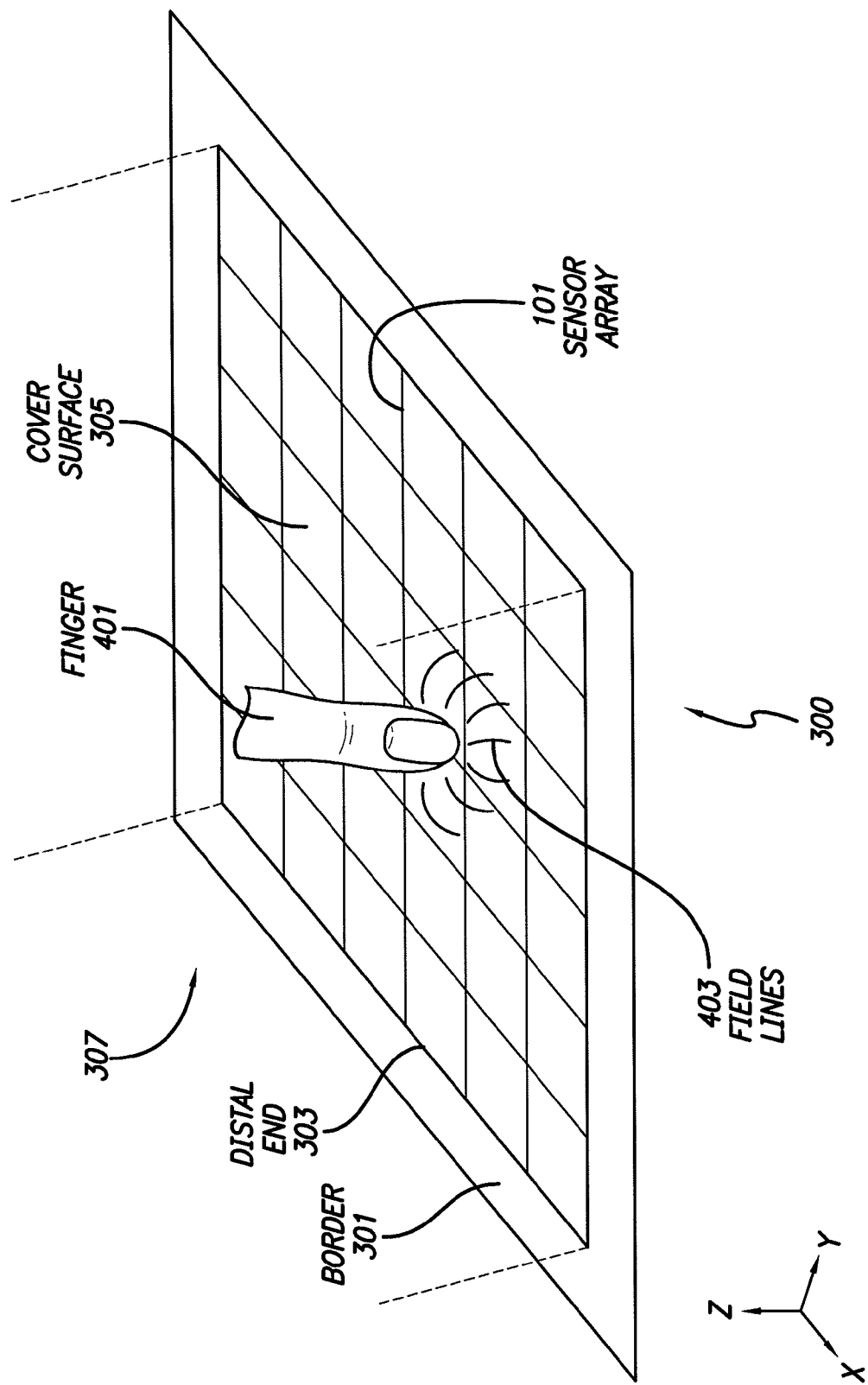
FIG. 4 illustrates an object directly above an example touch screen according to embodiments of the disclosure.

FIG. 4 shows a finger 401 hovering in space 307 directly above sensor array 101. Finger 401 can disturb electric field lines 403 from sensor array 101.

Figure 5:
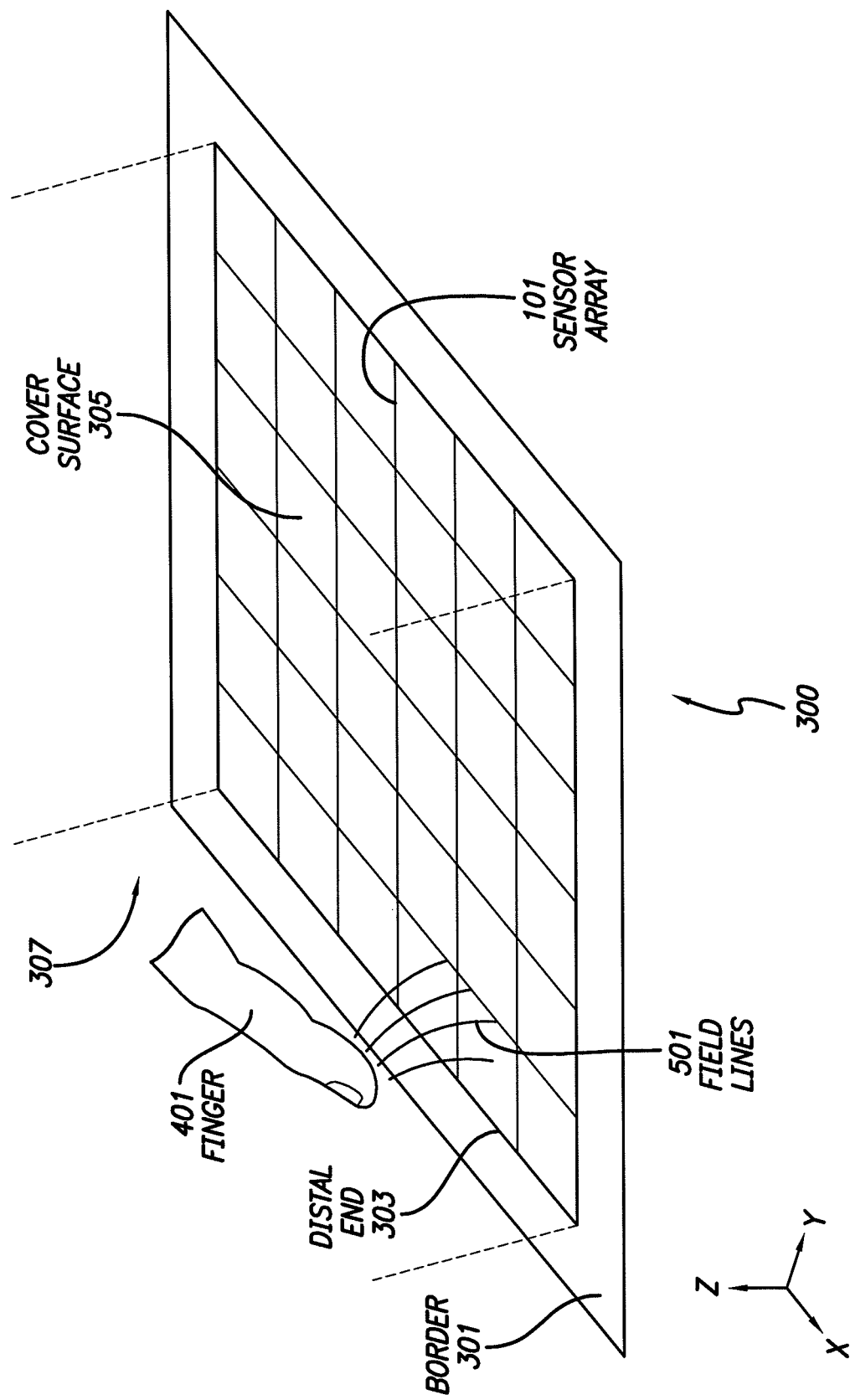
FIG. 5 illustrates an object outside of a space directly above an example touch screen according to embodiments of the disclosure.

FIG. 5 shows finger 401 near distal end 303 and outside of space 307. Even though finger 401 is outside of space 307 directly above sensor array 101, the finger still disturbs some of the field lines 501 emanating from some of the sensors of sensor array 101.

Figure 6:
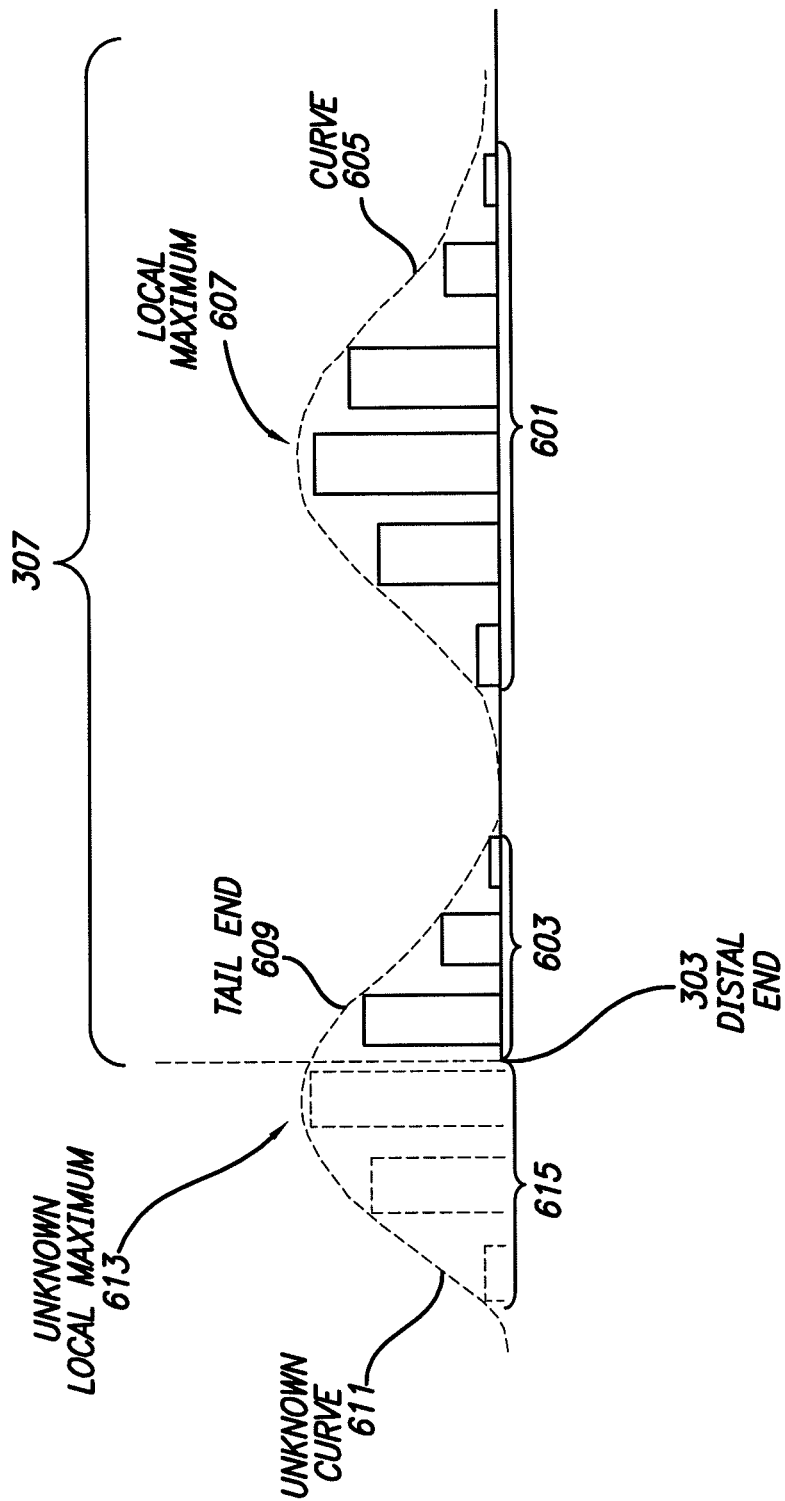
FIG. 6 illustrates example capacitance measurements according to embodiments of the disclosure.

FIG. 6 illustrates capacitance measurements 601 representing measurements from FIG. 4 and measurements 603 representing measurements from the configuration in FIG. 5. Measurements 601 can represent a typical shape of a set of capacitance measurements of sensors of sensor array 101 near a touch object such as finger 401 shown in FIG. 4. In particular, measurements closer to the center of finger 401 can be greater than measurements further from the center. Therefore, the shape of measurements 601 can be modeled, for some objects and sensor arrays, with a curve 605, such as a Gaussian curve, for example. Curve 605 can have a local maximum 607, which can represent the center of finger 401, for example. Curve 605 also has tail ends on either side of local maximum 607. FIG. 6 also shows measurements 603, which represent the set of capacitance measurements measured by sensors near distal end 303 of sensor array 101 after finger 401 has traveled outside of space 307, past distal end 303. In this case, measurements 603 represent only a tail end 609 of the curve that would be measured if finger 401 were inside of space 307. In other words, measurements 603 are an incomplete set of measurements, at least as compared to measurements 601.

In typical algorithms used to determine position and/or hover height of an object directly above a sensor array of a touch screen, for example, a full set of measurements such as measurements 601 can provide enough data to determine the position from a determination of local maximum 607. In this case, the determination of local maximum 607 can be easily made because the set of measurements 601 spans local maximum 607. In other words, local maximum 607 can be within the range of measurements 601. On the other hand, measurements 603 represent only tail end 609 portion of a complete curve, which does not include direct information of a local maximum. Thus, while the shape of tail end 609 can be known, the shape of the complete curve that would be measured if sensor array 101 extended beyond distal end 303 can be unknown.

FIG. 6 shows one possible estimate of an unknown curve 611 based on a set of unknown measurements 615. Unknown curve 611 and unknown measurements 615 are not actually measured, but are provided for purposes of illustration to show the general idea of how tail end measurements caused by an object near a distal end of an array of sensors and outside of the space directly above the array may be used to detect a hover position and/or hover height of the object. In particular, it may be recognized that measurements 603 represent a tail end 609 of unknown curve 611 and at that determining the parameters of unknown curve 611, and consequently determining unknown local maximum 613, can provide information about the hover position and/or height of the object. Consequently, a hover position of the object outside of the range of sensor positions of sensor array 101 may be determined based on the determined local maximum 613.

Figure 7:
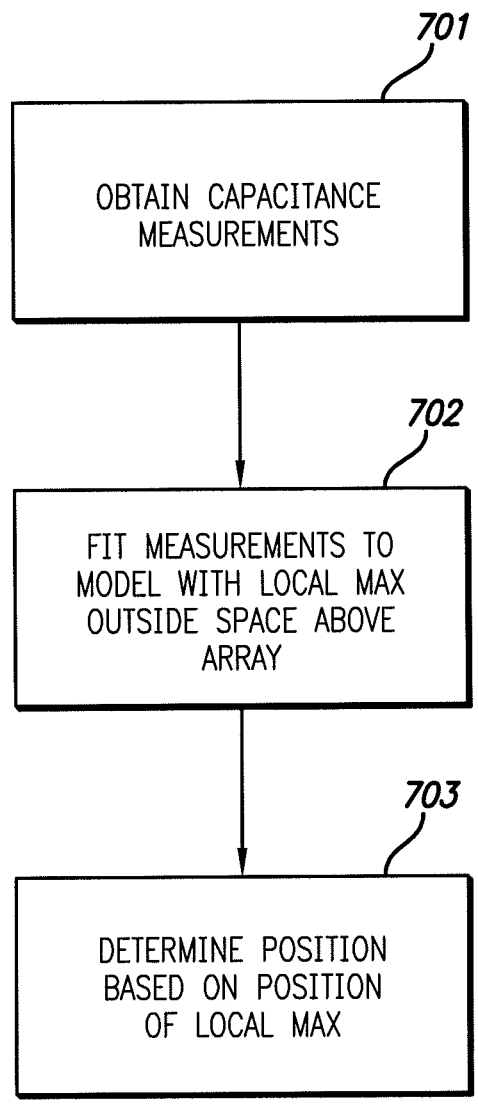
FIG. 7 is a flowchart of an example method of determining a hover position/height according to embodiments of the disclosure.

FIG. 7 shows an example method of detecting a hover position of an object outside of space 307 using measurements 603. The example method of FIG. 7, and other methods described herein, may be performed in, for example, touch and hover control system 107, a general purpose processor such as a central processing unit (CPU) (not shown), and/or another processor, and results may be stored in, for example, memory 313 and/or another memory (not shown) as one skilled in the art would readily understand in view of the present disclosure. Referring to FIG. 7, measurements 603 can be obtained (701) and fit (702) to a model including a local maximum outside of space 307. A variety of models may be used, as well as a variety of fitting methods, to fit measurements 603 to determine the hover position of finger 401. For example, a Gaussian curve may be used as a model of the type of curve to fit to measurements 603. In particular, it may be observed from FIG. 6 that curve 605, which approximates one set of measurements 601 of finger 401 in one location, appears substantially Gaussian-shaped. Therefore, it may be reasonable to assume that sensor readings made by an object similar to finger 401 will be Gaussian-shaped. In this case, the model selected to fit measurements 603 can be a Gaussian curve.

Various methods can be used to fit a Gaussian curve to measurements 603. For example, one method that may be used is a maximum likelihood estimate method. In this case, for example, parameters of a Gaussian curve, such as maximum height and standard deviation, may be adjusted until differences (errors) between the estimated Gaussian curve and measurements 603 are minimized. The Gaussian curve with the lowest estimated error can be used to determine unknown local maximum 613, which can represent the position of finger 401 outside of space 307.

In some embodiments, the model used may be another type of curve, for example a modified Gaussian curve, a custom curve determined from previous data, etc. In some embodiments, the model used may not be a curve at all, but may simply be a set of parameters stored in a lookup table (LUT). In this case, individual sensor measurements may be individually fit to the values stored in the lookup table, and once the best match is found, the lookup table can simply return a single value representing the determined hover position of the object. The hover position values in the lookup table can be based on, for example, empirical data of hover positions corresponding to particular sensor measurements, previously calculated curve modeling, etc.

In some embodiments, other parameters may be used in the determination of hover position and/or height. For example, if the object's size, conductivity, etc., are known, these parameters may be included when fitting the measured capacitances to the model. In some embodiments, a model can be based on a previous set of capacitance measurements of the object that includes a local maximum.

In some embodiments, information regarding object size, velocity, etc., may be taken into consideration in determining a model to be used in fitting the capacitance measurements. For example, FIGS. 4-6 illustrate an example situation in which a finger 401 travels from the middle of sensor array 101 toward distal end 303 and then past distal end 303 and outside of space 307. In this example case, the method could record the set of measurements 601 as the model to which measurements 603 will be fitted. The measurements 601 may be stored directly into a lookup table, for example. In another embodiment, measurements 601 may be interpolated to generate a model curve for use in fitting measurements 603.

In some embodiments, other information about finger 401, such as the finger's velocity, may be used when fitting measurements 603. For example, the velocity of finger 401, which may be determined by a separate algorithm, may be used as a parameter in the model used during the fitting process. In this way, a curve or representation of measurements 601 may be tracked as finger 401 travels outside of space 307, such that information regarding the local maximum of the curve can be maintained even though the local maximum may not be directly detected in measurements 603.

In some embodiments, multiple models may be considered during fitting of the measurements. For example, the method may determine that more than one object is causing the particular capacitance measurements near a distal end of the sensor array, and the method may use more than one model and/or fitting method to attempt to fit the capacitance measurements to one or more objects and/or types of objects. For example, the method may determine that the capacitance measurements are caused by multiple objects of the same type, such as "three fingers", or "two thumbs", etc. The method may determine that the capacitance measurements are caused by objects of different types, such as "a finger and a thumb", or "a first and a thumb", etc. The method may determine that the capacitance measurements are caused by a variety of numbers and types of objects, such as "two fingers and a first", or "a left thumb, a right finger, and a palm", etc. The method may fit different models, corresponding to the different number and/or type of objects, to different portions of the capacitance measurements. For example, the method may determine that the capacitance measurements are caused by two objects, e.g., a finger that was previously tracked as it moved off of the sensor array and an unknown object estimated to be a thumb. In this case, the method may attempt to fit the capacitance measurements corresponding to the finger to previously stored data by fitting individual sensor measurements to previously stored values in a LUT and fit the capacitance measurements corresponding to the thumb to a Gaussian curve using a maximum likelihood estimate of parameters associated with a thumb. Thus, some embodiments may estimate the number of objects and the parameters of each object when fitting the capacitance measurements.

In some embodiments, the position and/or motion of an object near the distal end of a sensor array and outside of the space directly above the sensor array may be processed as a user input. For example, a position and/or motion of an object may be processed as an input to a graphical user interface (GUI) currently displayed, as an input independent of a GUI, etc.

For example, the method described with reference to FIG. 7 may be used to determine a user input based on the position and/or motion of one or more objects including objects near the distal end of a sensor array and outside of the space directly above the sensor array. The hover position of an object in a border area outside the sensor array may be measured multiple times to determine multiple hover positions. The motion of the object can be determined corresponding to the multiple measured hover positions, and an input can be detected based on the determined motion of the object. For example, a finger detected moving upwards in a border area may be interpreted as a user input to increase the volume of music currently being played. In some embodiments, the user input may control a GUI. For example, a finger detected moving in a border area may control a GUI item, such as an icon, a slider, a text box, a cursor, etc., in correspondence with the motion of the finger.

In some embodiments, a user input can be based on a combination of information including the position and/or motion of an object directly above the sensor array and the position and/or motion of an object near the distal end of the sensor array and outside of the space directly above the sensor array. Referring to FIGS. 3-5, for example, a GUI may be displayed at cover surface 305. The method described above with reference to FIG. 7 may be used, for example, to control the motion of a GUI item as finger 401 travels off of the touch screen. For example, finger 401 may initiate an input direct above sensor array 101 to "drag" an icon displayed by the GUI. The icon may be controlled by display driver 319 to move along a path corresponding to the motion of finger 401 inside of space 307. If finger 401 is detected to move outside of space 307 and to stop at a position near the distal end of sensor array 101, display driver 319 can control the icon to continue moving along the path of the finger just prior to the finger moving off of the touch screen. Display driver 319 can cease the motion of the icon when finger 401 is detected to move away from its stopped position. This may be helpful to allow dragging and/or pointing actions to be continued even when a finger, for example, moves off of the touch screen.

FIGS. 8-11 describe examples of different hardware, software, and firmware embodiments that can perform joint operations of touch sensing and hover sensing. For example, in some embodiments, one set of sensors can be used for hover sensing and another set of sensors can be used for touch sensing. For instance, electrodes configured for self-capacitance measurements can be used for hover sensing, and electrodes configured for mutual capacitance measurements can be used for touch sensing. In these cases, switching between touch sensing and hover sensing may be done to save power, reduce interference, etc. In other embodiments, the same sensors may be shared between hover sensing and touch sensing. In these cases, switching may be necessary in order to utilize shared circuit elements, for example. Software and/or firmware may control the joint operation of touch and hover sensing. For example, depending on the particular configuration, software and/or firmware may determine when to switch between touch sensing and hover sensing, e.g., in single-mode operation, determine when to perform touch and hover sensing concurrently, e.g., in multi-mode operation, activate different portions of a sensor to perform touch and/or hover sensing, etc.

Figure 8:
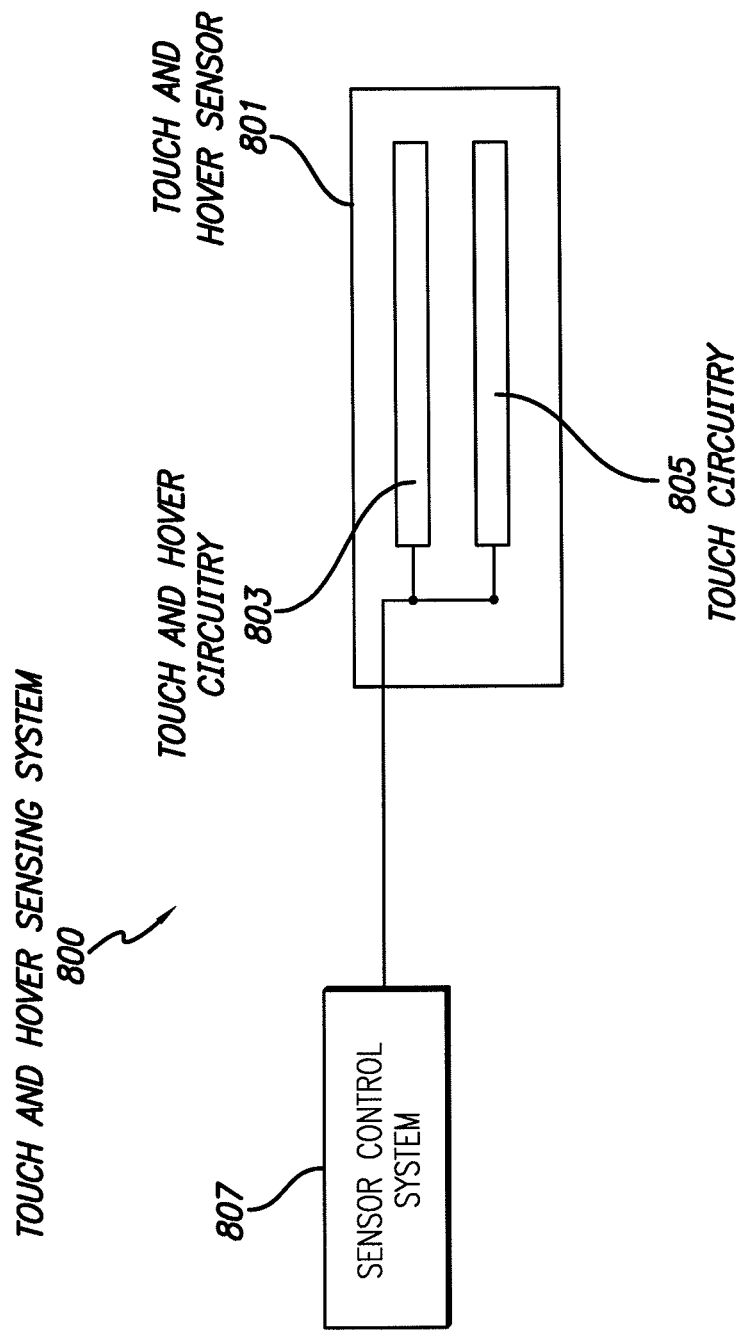
FIG. 8 illustrates an example touch and hover sensing system according to embodiments of the disclosure.
Figure 9:
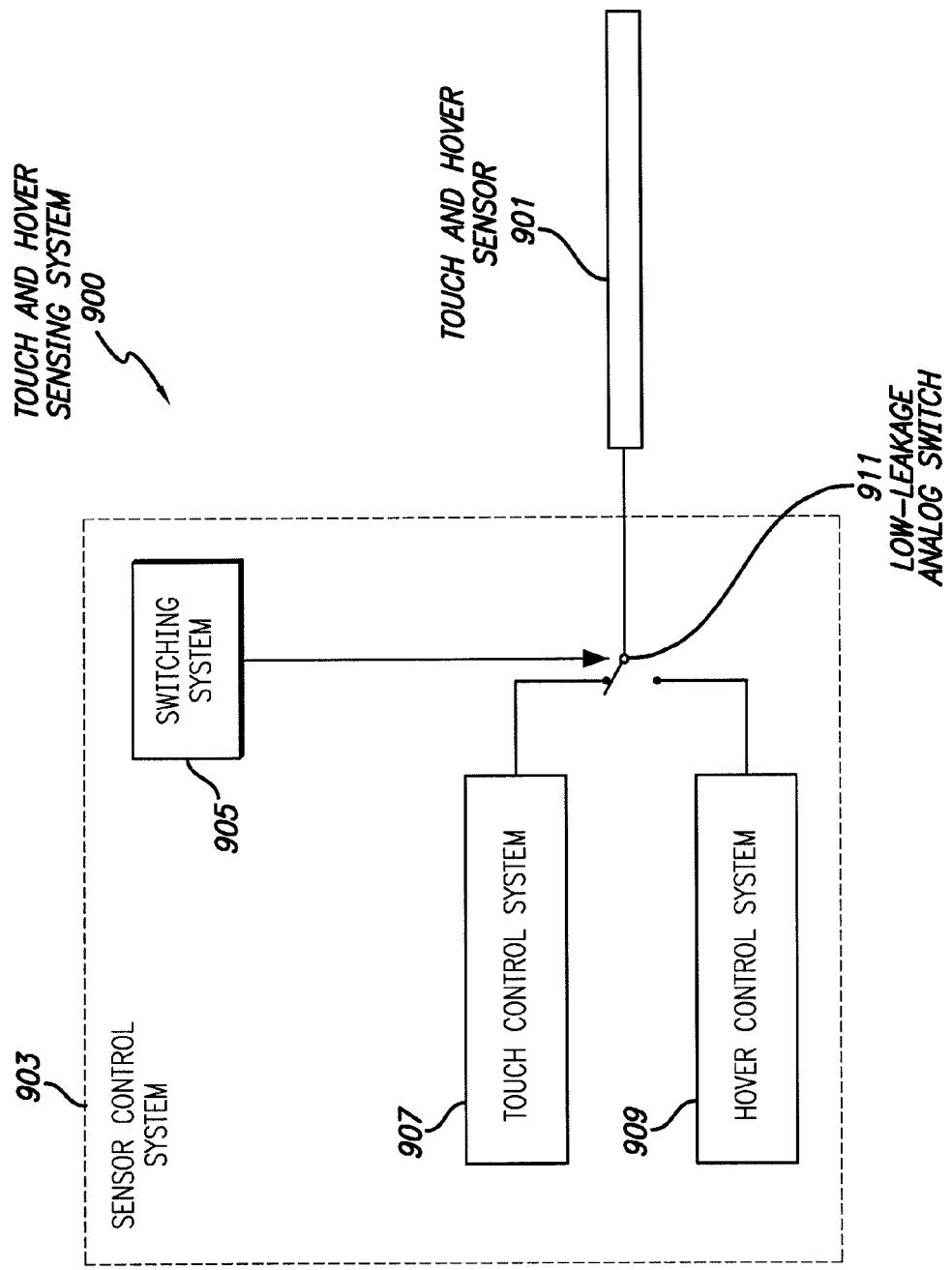
FIG. 9 illustrates an example touch and hover sensing system according to embodiments of the disclosure.

FIGS. 8-9 illustrate example embodiments of hardware switching that may be used to switch between touch sensing and hover sensing.

FIG. 8 shows an example touch and hover sensing system 800 including a sensor array 801 that includes touch and hover circuitry 803 and touch circuitry 805. For example, touch and hover circuitry 803 can be a set of multiple conductive lines that can operate as a self-capacitance sensor to sense hover events, and touch circuitry 805 can be another set of multiple conductive lines that can sense touch events when paired with the conductive lines of touch and hover circuitry 803. Therefore, sensor array 801 includes common circuitry that operates in both the touch sensing phase and the hover sensing phase. A sensor control system 807 can operate sensor array 801 to detect both touch and hover, by transmitting signals corresponding to hover sensing to touch and hover circuitry 803 only, and by transmitting signals corresponding to touch sensing to touch and hover circuitry 803 and touch circuitry 805. Therefore sensor control system 807 can serve as an integrated touch control system and hover control system, and determine when to switch between touch sensing and hover sensing, as described in more detail below.

FIG. 9 shows an example touch and hover sensing system 900 including a sensor array 901 and a sensor control system 903. Sensor control system 903 includes a switching system 905, a touch control system 907, a hover control system 909, and a low-leakage analog switch 911. In operation, switching system 905 determines when switching from touch sensing to hover sensing, and vice versa, should occur and operates low-leakage analog switch 911 to switch between touch control system 907 and hover control system 909 accordingly. During a touch sensing phase, touch control system transmits an AC signal to sensor array 901 and measures a capacitance of the sensor array resulting from the AC signal. During a hover sensing phase, hover control system 909 transmits an AC signal to sensor array 901 and measures a capacitance of sensor array 901 resulting from the AC signal.

Figure 10:
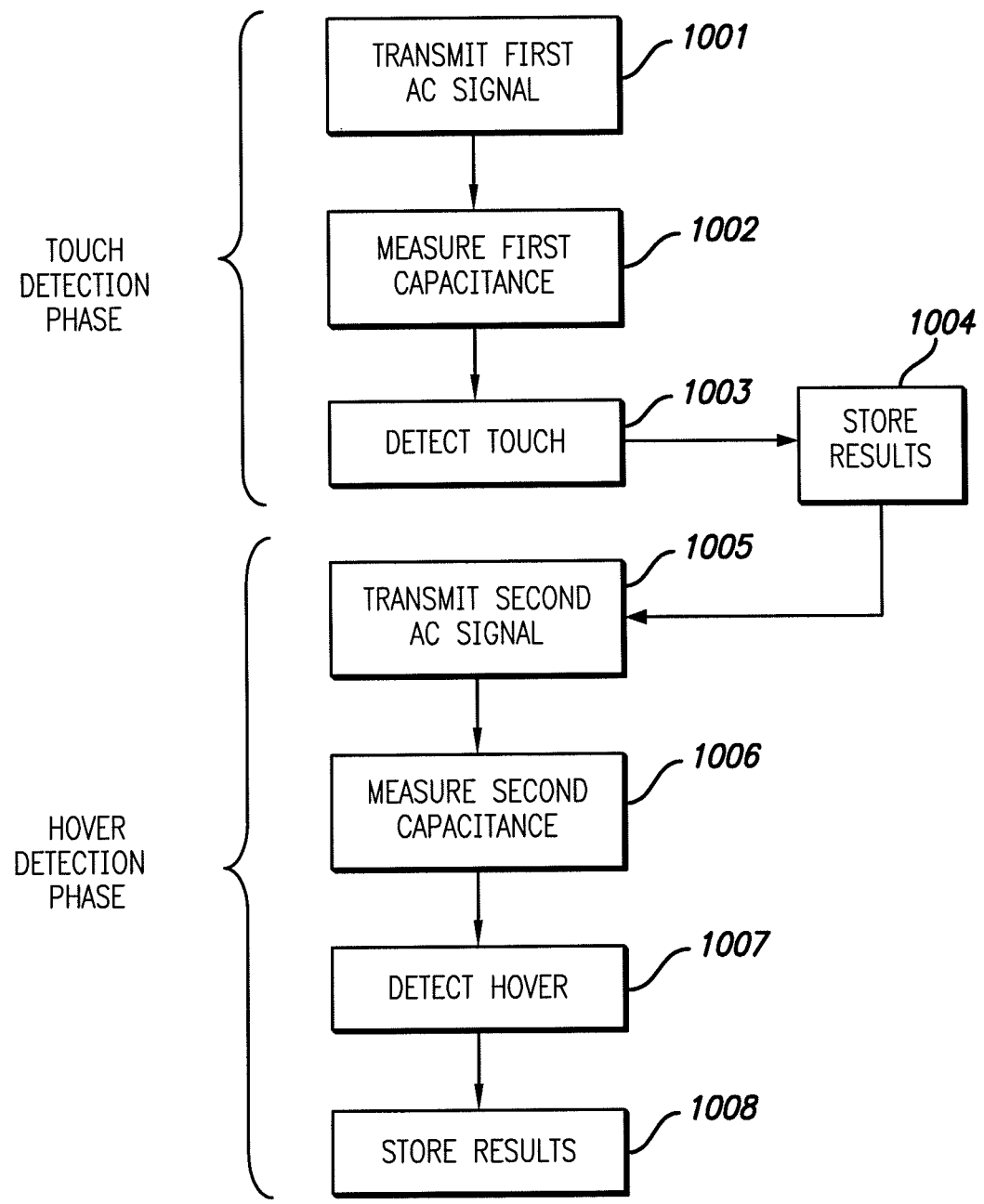
FIG. 10 is a flowchart of an example method of detecting touch and hover events according to embodiments of the disclosure.
Figure 11:
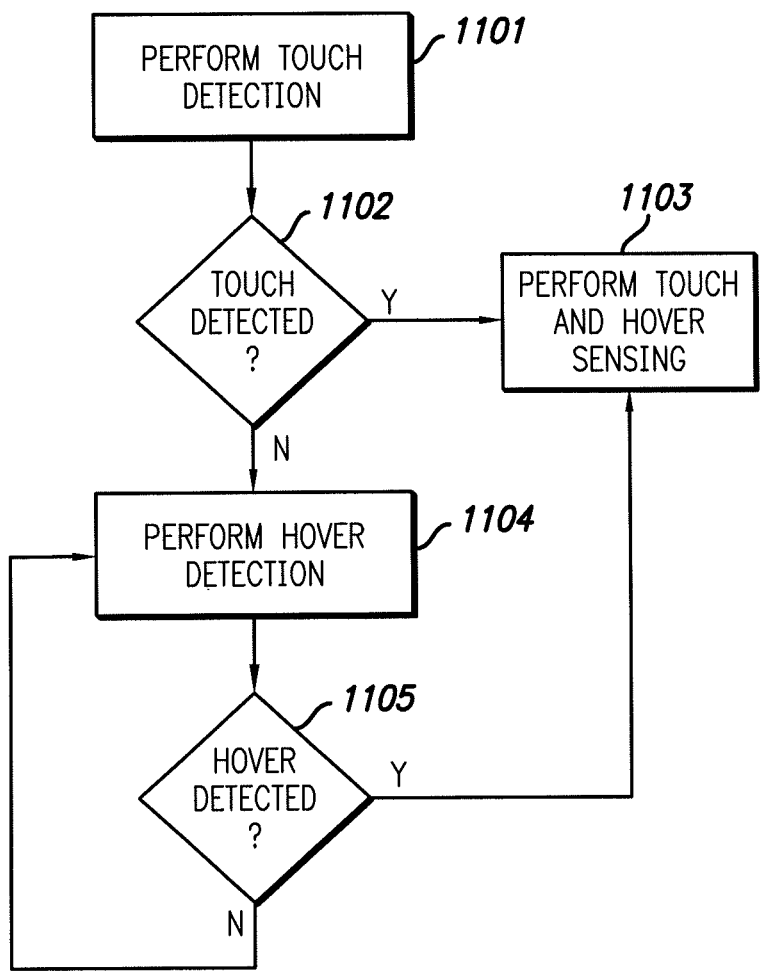
FIG. 11 is a flowchart of an example method of operating a touch and hover sensing system according to embodiments of the disclosure.

FIGS. 10-11 show example methods of joint touch and hover sensing, which can be implemented, for example, in software, firmware, application-specific integrated circuits (ASICs), etc.

FIG. 10 shows an example method for detecting a touch event and a hover event on or near a touch and hover sensing apparatus, such as touch screen 300. In a touch detection phase, touch and hover control system 107 can transmit (1001) a first AC signal to sensor array 101, and can measure (1002) a first capacitance of the sensor array. Touch and hover control system 107 can detect (1003) a touch event based on the first capacitance, and store (1004) touch event data, e.g., position, size, shape, gesture data, etc., in a memory. In a hover detection phase, touch and hover control system 107 can transmit (1005) a second AC signal to sensor array 101, and can measure (1006) a second capacitance of the sensor array. Touch and hover control system 107 can detect (1009) a hover event based on the second capacitance, and store (1010) hover event data, such as position, height, size, gesture data, etc.

Other operations can be occurring during or in between the touch detection and hover detection phases. For example, display driver 319 may transmit image signals to display circuitry 317 in a display phase that can be in between the touch sensing phase and the hover sensing phase. During the touch and/or hover sensing phases, AC shield driving system 203 may operate as described above to shield transmission line 309 using transmission line AC shield 308, and to boost the electric field emanating from cover surface 305 using AC shield 201. The touch detection phase and hover detection phase may occur in any order.

Some embodiments may not be able to sense touch and hover concurrently, i.e., only a single mode of sensing (non-overlapping touch/hover sensing) is possible. In this case, in some embodiments touch sensing and hover sensing may be time multiplexed, that is, touch and hover sensing can be performed during different, non-overlapping periods of time. Various methods can be implemented for deciding how to time multiplex the sensing operations, i.e., deciding whether touch sensing or hover sensing (or neither) should be performed at a particular time.

In some embodiments, touch and hover sensing can operate concurrently, i.e., multi-mode sensing. Even if a system can perform multi-mode touch and hover sensing, it may be advantageous to perform single mode sensing in some cases. For example, if either touch sensing or hover sensing is not needed at a particular time, switching to single mode sensing to save power may be desirable.

In some embodiments, the operation of touch sensing and hover sensing can be determined by a fixed schedule. In other embodiments, the time and duration of touch and hover sensing can be varied dynamically, for example, by setting the system to operate in one of a number of operational modes including the touch sensing mode and the hover sensing mode, and possibly other modes, such as a display mode. For instance, FIG. 11 shows an example method for determining whether to sense touch and/or hover. A touch sensing operation can be performed (1101), and can determine (1102) whether a touch is detected. If a touch is detected, the system can perform (1103) both touch and hover sensing, either by switching between the two, or by performing touch and hover sensing concurrently if the system is capable of multi-mode sensing. Both touch and hover sensing can be performed after a touch is detected because the touch may indicate a period of user activity during which a user may perform hover events and touch events.

If a touch is not detected at 1102, the system can perform (1104) hover detection, and can determine (1105) whether a hover is detected. If a hover is detected, the system can perform (1103) both touch and hover sensing, because the hover may indicate a period of user activity. If a hover is not detected at 1105, the system can perform (1104) hover detection again. As long as a hover is not detected, the system may not need to perform touch detection, because any approaching object will cause a hover detection before the object can touch down on the sensing system.

Other factors may be used to determine whether to detect touch, hover, both or neither. For example, some embodiments may detect an approaching object during hover sensing and wait until the object gets close to the touch surface to perform touch sensing. In other words, a distance threshold can be used to activate touch sensing. In some embodiments, the touch/hover mode may be determined by a particular software application that may require, for example, touch data but not hover data. In some embodiments, the current number and/or position of touches may be used as a factor. For example, a small mobile touch screen device may alternate between touch sensing and hover sensing until a predetermined number of contacts, e.g., five, touch the touch surface. When five touch contacts are detected, the device can cease detecting hover and can detect only touch because a user is unlikely to use sixth object to perform a hover, for example.

Some embodiments may be capable of multi-mode operation, i.e., performing touch sensing and hover sensing concurrently. For example, some embodiments can use frequency multiplexing to combine AC signals used for touch sensing with different frequency AC signals used for hover sensing. In some embodiments, code division multiplexing of the AC signals can be used to perform concurrent touch sensing and hover sensing.

Frequency multiplexing and code division multiplexing can allow circuit elements, such as sensing electrodes, to be used to detect touch and hover concurrently. For example, an entire array of sensors may be simultaneously stimulated to detect touch and hover.

In some embodiments, touch sensing and hover sensing may be space multiplexed by, e.g., operating one portion of a sensor array for touch sensing and concurrently operating another portion of the sensor array for hover sensing. For example, an AC signal used for touch sensing can be transmitted to a first group of sensors of the sensor array, and an AC signal used for hover sensing can be transmitted to a second group of sensors of the array. The groups of sensors may be changed dynamically, such that touch and hover sensing can be performed by different portions of the sensor array at different times. For example, touch sensing can be activated for portions of the sensor array on which touches are detected, and the remaining sensors may be operated to detect hover. The system can track moving touch objects and adjust the group of sensors sensing touch to follow the moving object.

Figure 12C:
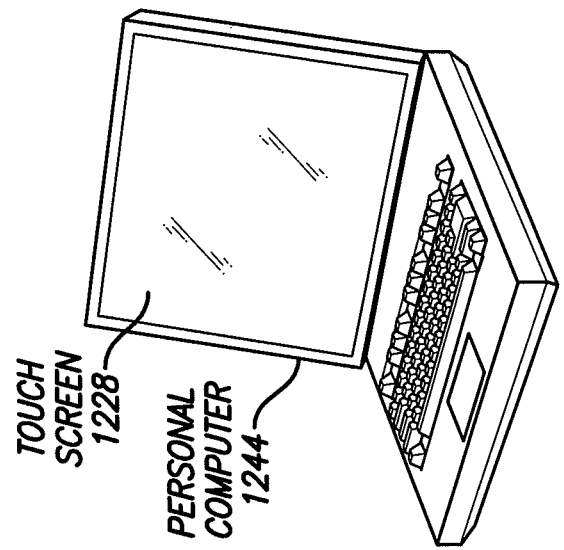
FIG. 12C illustrates an example personal computer that can include improved capacitive touch and hover sensing according to embodiments of the disclosure.
Figure 12B:
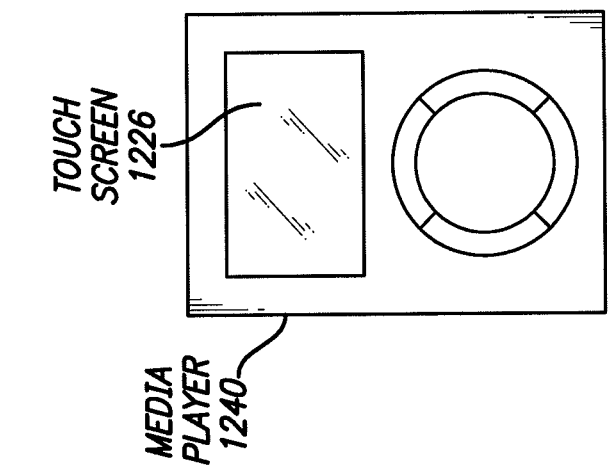
FIG. 12B illustrates an example digital media player that can include improved capacitive touch and hover sensing according to embodiments of the disclosure.
Figure 12A:
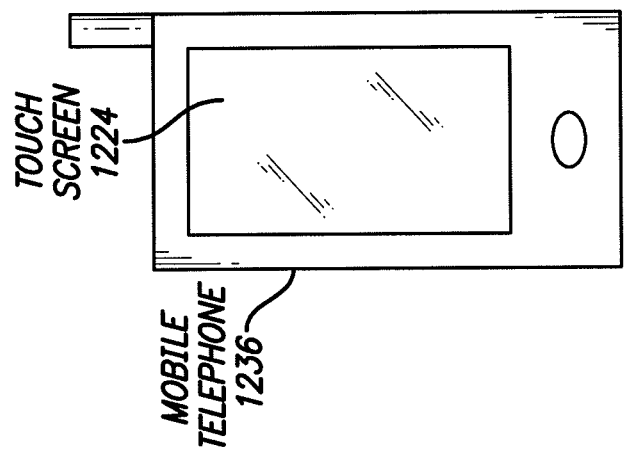
FIG. 12A illustrates an example mobile telephone that can include improved capacitive touch and hover sensing according to embodiments of the disclosure.

FIG. 12A illustrates an example mobile telephone 1236 that can include touch sensor panel 1224 and display device 1230, the touch sensor panel including improved capacitive touch and hover sensing according to one of the various embodiments described herein.

FIG. 12B illustrates an example digital media player 1240 that can include touch sensor panel 1224 and display device 1230, the touch sensor panel including improved capacitive touch and hover sensing according to one of the various embodiments described herein.

FIG. 12C illustrates an example personal computer 1244 that can include touch sensor panel (trackpad) 1224 and display 1230, the touch sensor panel and/or display of the personal computer (in embodiments where the display is part of a touch screen) including improved capacitive touch and hover sensing according to the various embodiments described herein.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various example embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described example embodiments.

What is claimed is:

1. A capacitive touch sensing apparatus comprising:
   a cover surface;
   a sensor array substantially adjacent to the cover surface;
   a touch control system configured to transmit a first alternating current (AC) signal to the sensor array and measure a capacitance of the sensor array resulting from the first AC signal; and
   switching circuitry capable of switching the sensor array from a mutual capacitance detection configuration to a self capacitance detection configuration, the sensor array configured to operate in the mutual capacitance detection configuration during a first detection mode, and in the self capacitance detection configuration during a second detection mode,
   wherein the touch control system is further configured to:
      perform a first self capacitance measurement at the sensor array;
      in accordance with a determination that the first self capacitance measurement is indicative of activity of an object on the sensor array, independent of a distance of the object from the sensor array, cause the switching circuitry to alternate the sensor array between the mutual capacitance detection configuration and the self capacitance detection configuration; and
      in accordance with a determination that the first self capacitance measurement is not indicative of activity on the sensor array, perform a second self capacitance measurement at the sensor array.

2. The capacitive touch sensing apparatus of claim 1, wherein the sensor array includes an electrode including a substantially transparent conductor.

3. The capacitive touch sensing apparatus of claim 1, further comprising:
   an AC shield, wherein the sensor array is positioned substantially between the AC shield and the cover surface; and
   an AC shield driving system that transmits a second AC signal to the AC shield such that a first voltage of the sensor array is substantially the same as a second voltage of the AC shield.

4. The capacitive touch sensing apparatus of claim 3, wherein the AC shield is electrically isolated from the sensor array.

5. The capacitive touch sensing apparatus of claim 3, wherein the AC shield includes an electrode including a non-transparent conductor.

6. The capacitive touch sensing apparatus of claim 3, further comprising:
   a second AC shield substantially surrounding at least a portion of a transmission line connecting the touch control system and the sensor array, the first AC signal being transmitted on the transmission line.

7. The capacitive touch sensing apparatus of claim 3, wherein the first AC signal has a waveform and the second AC signal is generated from a buffered copy of the waveform.

8. A touch screen including the capacitive touch sensing apparatus of claim 3, wherein the touch screen further comprises:
a display, wherein the touch control system and the AC shield are substantially collocated with the display, the display including display circuitry, and the AC shield is positioned substantially between the display circuitry and the sensor array.

9. The capacitive touch sensing apparatus of claim 1, wherein the switching circuitry comprises a switch.

10. The capacitive touch sensing apparatus of claim 1, further comprising a switching system to control the switching circuitry.

11. The capacitive touch sensing apparatus of claim 1, wherein the activity on the sensor array comprises touch or hover activity on the sensor array.

12. A method of detecting a hover position of an object near a distal end of a sensor array and outside of a space directly above the sensor array, the method comprising:
obtaining a set of capacitance measurements of a plurality of sensors of the sensor array in a range of sensor positions near the distal end of the sensor array, the capacitance measurements being caused by the object;
fitting the set of capacitance measurements to a model that defines a curve including a local maximum with a position outside of the range of sensor positions; and
determining the hover position based on the position of the local maximum.

13. The method of claim 12, wherein the model is based on a previous set of capacitance measurements of the object, wherein the previous set includes a local maximum.

14. The method of claim 12, wherein the model includes a Gaussian curve.

15. The method of claim 12, wherein the fitting includes determining a maximum likelihood estimate of parameters of the model.

16. The method of claim 15, wherein the parameters include at least one of object conductivity and object size.

17. The method of claim 15, wherein the fitting includes estimating a number of objects and parameters of each object.

18. The method of claim 12, wherein the fitting includes determining a closest match between the capacitance measurement of a first sensor of the plurality of sensors and one of plurality of stored capacitance measurements of the sensor array.

19. A method of detecting a user input, including the method of detecting a hover position of claim 12, the method further comprising:
detecting a plurality of hover positions of the object near the distal end of a sensor array and outside of the space directly above the sensor array;
determining a motion of the object corresponding to the plurality of detected hover positions; and
detecting the user input based on the determined motion of the object.

20. The method of claim 19, further comprising:
controlling a graphical user interface (GUI) based on the detected user input.

21. A method of controlling a motion of a graphical user interface (GUI) item including the method of detecting a hover position of claim 12, the method further comprising:
moving the GUI item in correspondence with a motion of the object inside of the space directly above the sensor array; and
continuing the motion of the GUI item when the motion of the object is detected to stop at a hover position near the distal end of the sensor array and outside of the space directly above the sensor array.

22. A capacitive touch sensing apparatus comprising:
a sensor array;
a sensor control system including a first control system configured to, during a mutual capacitance measurement mode, transmit a first alternating current (AC) signal to the sensor array and measure a mutual capacitance of the sensor array resulting from the first AC signal, and a second control system configured to, during a self capacitance measurement mode, transmit a second alternating current (AC) signal to the sensor array and measure a self capacitance of the sensor array resulting from the second AC signal; and
a switching system configured to switch the sensor control system between the mutual capacitance measurement mode and the self capacitance measurement mode,
wherein the sensor control system is configured to:
perform a first self capacitance measurement at the sensor array;
in accordance with a determination that the first self capacitance measurement is indicative of activity of an object on the sensor array, independent of a distance of the object from the sensor array, alternate between the mutual capacitance measurement mode and the self capacitance measurement mode; and
in accordance with a determination that the first self capacitance measurement is not indicative of activity on the sensor array, perform a second self capacitance measurement at the sensor array.

23. The capacitive touch sensing apparatus of claim 22, wherein the sensor array includes common circuitry that operates in both the mutual capacitance measurement mode and the self capacitance measurement mode.

24. The capacitive touch sensing apparatus of claim 22, wherein the first control system includes first control system circuitry, and the second control system includes second control system circuitry, and the switching system includes a physical switch that alternatively connects the first control system circuitry to the sensor array or connects the second control system circuitry to the sensor array during the mutual capacitance measurement mode and the self capacitance measurement mode, respectively.

25. The capacitive touch sensing apparatus of claim 22, wherein the switching system includes a low-leakage analog switch.

26. A method for detecting a touch event on or near a touch sensing apparatus, the method comprising:
performing a first self capacitance measurement at a sensor array of the apparatus;
in accordance with a determination that the first self capacitance measurement is indicative of activity of an object at the sensor array, independent of a distance of the object from the sensor array:
transmitting a first alternating current (AC) signal to the sensor array, and measuring a mutual capacitance of the sensor array resulting from the first AC signal;
detecting a first touch event based on the mutual capacitance;
transmitting a second alternating current (AC) signal to the sensor array and measuring a self capacitance of the sensor array resulting from the second AC signal; and
detecting a second touch event based on the self capacitance; and in accordance with a determination that the first self capacitance measurement is not indicative of activity on the sensor array, performing a second self capacitance measurement at the sensor array.

27. The method of claim 26, wherein the first AC signal and the second AC signal are transmitted concurrently through one of frequency multiplexing and code division multiplexing.

28. The method of claim 26, wherein the first AC signal and the second AC signal are transmitted concurrently through space multiplexing, in which the first AC signal is transmitted to a first group of sensors of the sensor array, and the second AC signal is transmitted to a second group of sensors of the sensor array.

29. The method of claim 26, wherein the first AC signal is transmitted during a first sensing phase and the second AC signal is transmitted during a second sensing phase that is non-overlapping with the first sensing phase, the method further comprising:
 setting the apparatus to operate in one of a plurality of operational phases including the first sensing phase and the second sensing phase.

30. The method of claim 29, wherein setting the apparatus to operate in one of the plurality of operational phases is based on at least one of a predetermined schedule, a request from an external computer process, a current number and positions of objects detected, and a distance of an object from the sensor array.

31. A touch sensing device comprising:
 a touch sensing panel having multiple sensors, each sensor capable of detecting one or more objects proximate to the panel, wherein the objects touch the panel to cause a touch event, hover over the panel to cause a hover event, or touch and hover concurrently to cause touch and hover events; and
 a touch control system configured to:
  perform a first self capacitance measurement at the touch sensing panel;
  in accordance with a determination that the first self capacitance measurement is indicative of activity of an object on the touch sensing panel, independent of a distance of the object from the sensor array, operate the sensors in a mutual capacitance detection configuration and a self capacitance detection configuration; and
  in accordance with a determination that the first self capacitance measurement is not indicative of activity on the touch sensing panel, perform a second self capacitance measurement at the touch sensing panel.

32. The device of claim 31, wherein the touch control system is further configured to switch a portion of the sensors to the self capacitance detection configuration and another portion of the sensors to the mutual capacitance detection configuration so as to partition the panel to concurrently detect mutual capacitance and self capacitance.

33. The device of claim 31, further comprising a display configured to display graphical information to select in response to the touch and hover events.

34. The device of claim 31 incorporated into at least one of a mobile phone, a digital media player, or a computer.

35. A capacitive touch sensing apparatus comprising:
 a cover surface;
 a sensor array substantially adjacent to the cover surface; and
 a touch control system configured to:
  perform a first self capacitance measurement at the sensor array;
  in accordance with a determination that the first self capacitance measurement is indicative of activity of an object on the sensor array, independent of a distance of the object from the sensor array:
   transmit a first alternating current (AC) signal concurrently with a second alternating current (AC) signal to the sensor array, and
   measure a self capacitance of the sensor array resulting from the first AC signal concurrently with a mutual capacitance of the sensor array resulting from the second AC signal; and
  in accordance with a determination that the first self capacitance measurement is not indicative of activity on the sensor array, perform a second self capacitance measurement at the sensor array.

36. The capacitive touch sensing apparatus of claim 35, wherein the touch control system is further configured to combine the first AC signal and the second AC signal using frequency multiplexing before transmitting the combined signal to the sensor array.

37. The capacitive touch sensing apparatus of claim 35, wherein the touch control system is further configured to combine the first AC signal and the second AC signal using code division multiplexing before transmitted the combined signal to the sensor array.

38. The capacitive touch sensing apparatus of claim 35, wherein the first AC signal has a first frequency, and the second AC signal has a second frequency, the second frequency being different than the first frequency.

* * * * *